US007006179B2

(12) United States Patent
Kim

(10) Patent No.: US 7,006,179 B2
(45) Date of Patent: Feb. 28, 2006

(54) METHOD FOR MANUFACTURING LIQUID CRYSTAL DISPLAY DEVICE USING A DIFFRACTION MASK

(75) Inventor: Hye Young Kim, Taejeon-Kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 119 days.

(21) Appl. No.: 10/329,959

(22) Filed: Dec. 26, 2002

(65) Prior Publication Data

US 2003/0128329 A1 Jul. 10, 2003

(30) Foreign Application Priority Data

Dec. 29, 2001 (KR) ..................... 10-2001-0088479

(51) Int. Cl.
*G02F 1/1335* (2006.01)

(52) U.S. Cl. ...................................................... 349/113

(58) Field of Classification Search ................. 349/113
See application file for complete search history.

(56) References Cited

U.S. PATENT DOCUMENTS

| | | | | |
|---|---|---|---|---|
| 6,573,959 | B1 * | 6/2003 | Molsen | 349/113 |
| 6,600,535 | B1 * | 7/2003 | Tsuda et al. | 349/113 |
| 6,686,982 | B1 * | 2/2004 | Yoshii | 349/113 |
| 6,747,718 | B1 * | 6/2004 | Kanou et al. | 349/113 |
| 6,784,957 | B1 * | 8/2004 | Kanou et al. | 349/113 |
| 6,801,279 | B1 * | 10/2004 | Jang et al. | 349/113 |
| 6,873,384 | B1 * | 3/2005 | Yamanaka et al. | 349/113 |
| 2002/0051107 | A1 * | 5/2002 | Nagayama et al. | 349/113 |
| 2002/0067445 | A1 * | 6/2002 | Tsai et al. | 349/113 |
| 2002/0084459 | A1 * | 7/2002 | Choi et al. | 257/72 |
| 2002/0085161 | A1 * | 7/2002 | Yoo et al. | 349/155 |
| 2002/0089628 | A1 * | 7/2002 | Jang et al. | 349/113 |
| 2002/0109799 | A1 * | 8/2002 | Choi et al. | 349/43 |

* cited by examiner

*Primary Examiner*—Frank G. Font
*Assistant Examiner*—Timothy L. Rude
(74) *Attorney, Agent, or Firm*—Brinks Hofer Gilson & Lione

(57) ABSTRACT

A method for manufacturing a liquid crystal display device is disclosed, in which a plurality of protrusions are formed on an organic insulating layer of a single layer, thereby obtaining a wide viewing angle. The method includes (a) forming an insulating layer on a substrate; (b) forming photoresist patterns having various shapes and heights on the insulating layer; (c) etching the insulating layer by using the photoresist patterns as masks so as to form protrusions on the surface of the insulating layer; and (d) forming a reflective layer on the insulating layer including the protrusions.

4 Claims, 5 Drawing Sheets

METHOD FOR MANUFACTURING LIQUID CRYSTAL DISPLAY DEVICE USING A DIFFRACTION MASK

This application claims the benefit of Korean Application No. P2001-88479, filed on Dec. 29, 2001, which is hereby incorporated by reference as if fully set forth herein.

BACKGROUND OF THE INVENTION

1. Field of the Invention

The present invention relates to a method for manufacturing a liquid crystal display (LCD) device, and more particularly, to a method for manufacturing a reflective type LCD device or a transflective type LCD device.

2. Discussion of the Related Art

Generally, a reflective type LCD device makes use of natural light (ambient light) as a light source without an additional light source. Meanwhile, a transflective type LCD device uses natural light in high light surroundings in the same way as the reflective type LCD device, and a backlight as a light source in low light surroundings, thereby requiring a relatively small amount of power consumption. At this time, reflective layers are commonly formed on lower substrates of the reflective and transflective type LCD devices.

The reflective type LCD device will be explained with a focus on one of the processing steps for forming the reflective layer. As the ambient light (natural light) is incident on an upper substrate of the reflective type LCD device, the natural light is reflected through a pixel electrode. In this state, the natural light may pass through or be absorbed to the upper substrate in accordance with the alignment of liquid crystal molecules.

A typical LCD device includes a plurality of gate and data lines, a plurality of pixel electrodes, and a plurality of thin film transistors (TFTs). At this time, the plurality of gate lines are formed on one substrate, and the plurality of data lines are formed perpendicular to the plurality of gate lines on the substrate, thereby forming a plurality of pixel regions. The pixel electrode is formed at each pixel region for driving a unit pixel. The plurality of thin film transistors (TFTs) are formed at crossing points of the gate and data lines for applying signals of the data lines to the pixel electrodes according to signals of the gate lines. If the pixel electrodes are made of a transparent material passing through light, the LCD device becomes a transmitting type LCD device. If the pixel electrodes are made of a reflective material or are connected to the transparent pixel electrode, the LCD device becomes a reflective type LCD device. Meanwhile, the transflective type LCD device has both reflective and transmitting parts inside unit pixel region.

A prior art reflective type LCD device will be explained with reference to the accompanying drawings.

FIG. 1 is a cross-sectional view of a prior art reflective type LCD device including a thin film transistor region and a pixel region. Referring to FIG. 1, lower and upper substrates 1 and 15 are formed to be opposite to each other. A plurality of gate and data lines (not shown) are formed on the lower substrate 1, and a plurality of thin film transistors (TFTs) are formed at crossing points of the gate and data lines on the lower substrate 1. Then, an organic insulating layer is formed on the lower substrate 1 including the TFTs. The organic insulating layer has first and second organic insulating layers 2 and 4 so as to improve the reflection angle of light. The first organic insulating layer 2 has a plurality of protrusions with a predetermined distance, and the second organic insulating layer 4 is formed on the first organic insulating layer 2 so as to bury the first organic insulating layer 2 including the plurality of protrusions.

At this time, the organic insulating layer includes a contact hole for exposing a predetermined portion of a drain electrode of the TFT, and a pixel electrode 5 of a reflective layer is formed in the pixel region that connects to the drain electrode through the contact hole. The pixel electrode 5 is made of an aluminum layer having adequate interfacial reflection characteristics. Since the pixel electrode is used for reflecting the incident light in the reflective type LCD device, it is possible to use an aluminum layer as the pixel electrode 5.

A black matrix layer 16, a color filter layer 17 and a common electrode 18 are formed on a surface of the upper substrate opposed to the lower substrate. The black matrix layer 16 is formed so as to prevent light from leaking out on portions of the lower substrate such as the TFT and gate and data lines except the pixel region. The color filter layer is formed at each region of the upper substrate corresponding to the pixel regions of the lower substrate so as to display various colors. The common electrode 18 is formed on an entire surface of the upper substrate including the black matrix layer 16 and the color filter layer 17.

Although not shown, alignment layers are formed on surfaces of the lower and upper substrate 1 and 15 opposite to each other. Also, spacers (not shown) are regularly formed between the lower and upper substrates 1 and 15 for maintaining a cell gap, and the lower and upper substrates are bonded to each other by a sealant. Subsequently, a liquid crystal layer 19 is formed between the lower and upper substrates 1 and 15.

As explained above, the organic insulating layer has a surface that includes a plurality of protrusions so as to improve the reflection angle of light. For instance, the first organic insulating layer 2 is formed on the entire surface of the lower substrate including the TFT, and the second organic insulating layer 4 is formed on the first organic insulating layer, thereby forming an organic insulating layer having an uneven surface. At this time, the pixel electrode 5 has an uneven surface in that the pixel electrode 5 is formed on the second organic insulating layer 4 having the uneven surface. Accordingly, the incident light is effectively reflected since the pixel electrode 5 has an uneven surface, so that an observer can see the reflected light well at different angles.

An operation of the reflective type LCD device having the aforementioned structure will be explained as follows.

If power for image signals is not applied to the pixel electrode 5, an electric field is not formed between the pixel electrode 5 and the common electrode 18. In this case, longitudinal directions of liquid crystal molecules of the liquid crystal layer 19 are parallel to the lower and upper substrates 1 and 15 due to the alignment layers. Upon light impinging on the liquid crystal layer 19 through a polarizing plate (not shown), the incident light is received by the pixel electrode 5 through the liquid crystal layer 19, and then is reflected from the pixel electrode 5. During this process, the display panel becomes dark because the reflected light, which is perpendicular to the polarized direction of the incident light due to the birefringence characteristics of the liquid crystal layer, is reflected by the polarizing plate.

If power for image signals is applied to the pixel electrode 5, an electric field is formed between the pixel electrode 5 and the common electrode 18. In this case, longitudinal directions of liquid crystal molecules of the liquid crystal layer 19 are perpendicular to the lower and upper substrates 1 and 15. Upon light impinging on the liquid crystal layer 19, the incident light is reflected from the pixel electrode 5, and passes through the polarizing plate since the polarized direction of the incident light is not changed, so that the display panel becomes white.

Also, if a λ/4 plate is additionally formed between the polarizing plate and the substrate in the prior art reflective type LCD device, the display panel is maintained in a bright state when the electric field is not formed between the pixel electrode and the common electrode.

The method for manufacturing the prior art reflective type LCD device has the following disadvantages.

In order to improve the reflection angle of light, the organic insulating layer includes the first organic insulating layer having the plurality of protrusions and the second organic insulating layer being formed on the first organic insulating layer to bury the first organic insulating layer. Accordingly, a manufacturing process step for the organic insulating layer is complicated, and a production cost is increased.

SUMMARY OF THE INVENTION

Accordingly, the present invention is directed to a method for manufacturing a liquid crystal display device that substantially obviates one or more problems due to limitations and disadvantages of the related art.

An object of the present invention is to provide a method for manufacturing a liquid crystal display device, in which a plurality of protrusions are formed on an organic insulating layer of a single layer, thereby obtaining a wide viewing angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing a liquid crystal display device according to the present invention includes (a) forming an insulating layer on a substrate; (b) forming photoresist patterns having various shapes and heights on the insulating layer; (c) etching the insulating layer by using the photoresist patterns as masks to form protrusions on the surface of the insulating layer; and (d) forming a reflective layer on the insulating layer including the protrusions.

In another aspect of the present invention, a method for manufacturing a liquid crystal display device according to the present invention includes (a) forming a first insulating layer on a substrate including a thin film transistor; (b) forming photoresist patterns having various heights on the first insulating layer; (c) etching the first insulating layer by using the photoresist patterns as masks to form protrusions on the first insulating layer and to form a first contact hole at a drain electrode of the thin film transistor; (d) forming a reflective layer at a predetermined portion of a pixel region including the protrusions for being connected to the drain electrode; (e) forming a second insulating layer having a second contact hole at a predetermined portion of the reflective layer on an entire surface of the substrate; and (f) forming a transparent electrode on the pixel region of the second insulating layer for being connected to the reflective layer.

In another aspect of the present invention, a method for manufacturing a liquid crystal display device according to the present invention includes (a) forming a first insulating layer on a substrate including a thin film transistor; (b) forming photoresist patterns having various heights on the first insulating layer; (c) etching the first insulating layer by using the photoresist patterns as masks to form protrusions on the first insulating layer; (d) forming a reflective layer at a predetermined portion of a pixel region including the protrusions; (e) forming a second insulating layer on an entire surface of the substrate including the reflective layer; (f) forming a contact hole on a drain electrode of the thin film transistor; and (g) forming a transparent electrode on a pixel region of the second insulating layer for being connected to the drain electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIG. 2A to FIG. 2D are cross-sectional views for illustrating manufacturing process steps of a reflective type LCD device according to the first embodiment of the present invention.

In the method for manufacturing the reflective type LCD device according to the first embodiment of the present invention, a method for forming a thin film transistor, a black matrix layer, a color filter layer and a common electrode is same as that in the prior art. Accordingly, an explanation in connection with the method for forming the same will be omitted.

Figure 1:
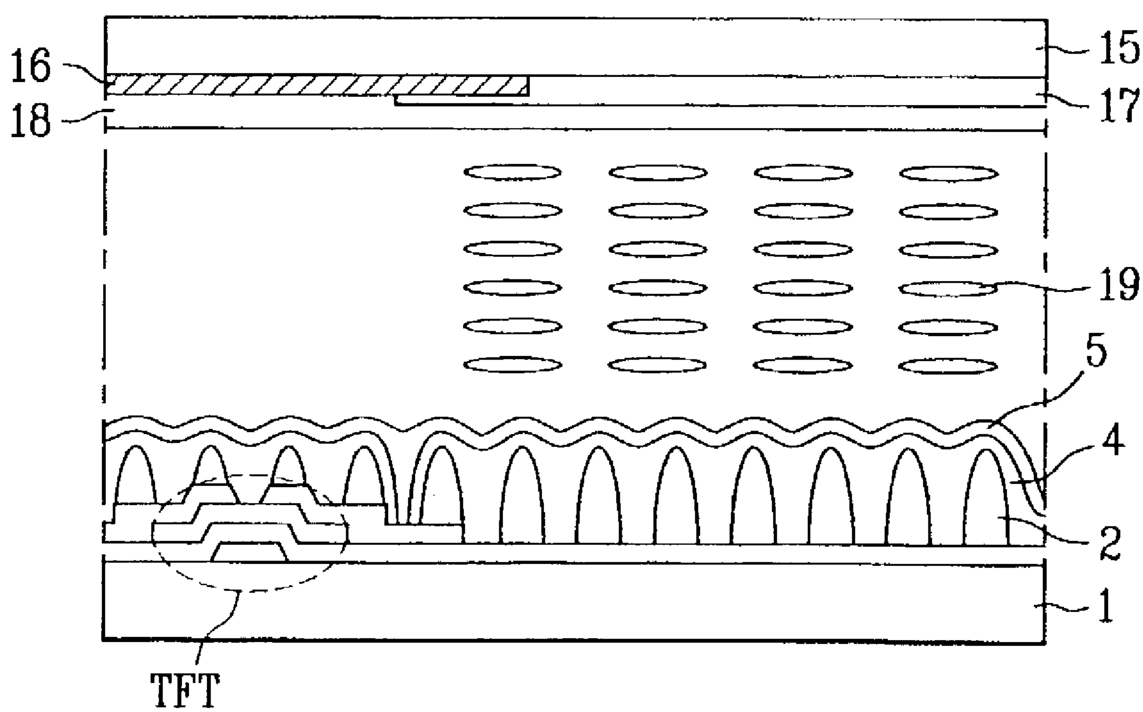
FIG. 1 is a cross-sectional view of a prior art reflective type liquid crystal display (LCD) device.
Figure 2A:
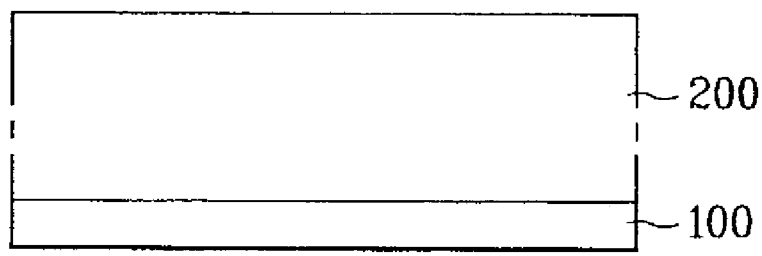
FIG. 2A to FIG. 2D are cross-sectional views for illustrating manufacturing process steps of a reflective type LCD device according to the first embodiment of the present invention.
Figure 2B:
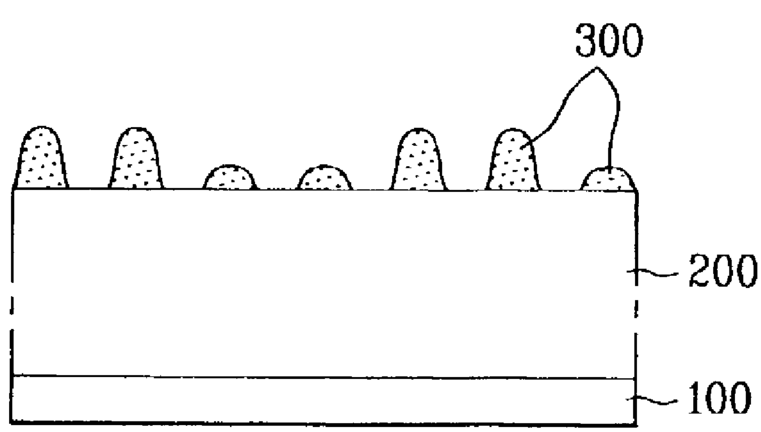

Referring to FIG. 2A, an organic insulating layer 200 is formed on a substrate 100 that includes a plurality of gate lines, a plurality of data lines and a plurality of thin film transistors (TFT). The organic insulating layer may be made of any one of acryl resin, polyimide, or benzo cyclo butene (BCB). Then, as shown in FIG. 2B, a photoresist layer is deposited on the organic insulating layer 200, and is performed by exposing and developing processes using a mask, thereby forming photoresist patterns 300 having different heights. The different heights are formed in accordance with the diffraction principles of a diffraction mask (not shown) used in the process. Also, the photoresist layer may be formed in exposing and developing processes with masks on which various materials having different transmittances are deposited.

Figure 2C:
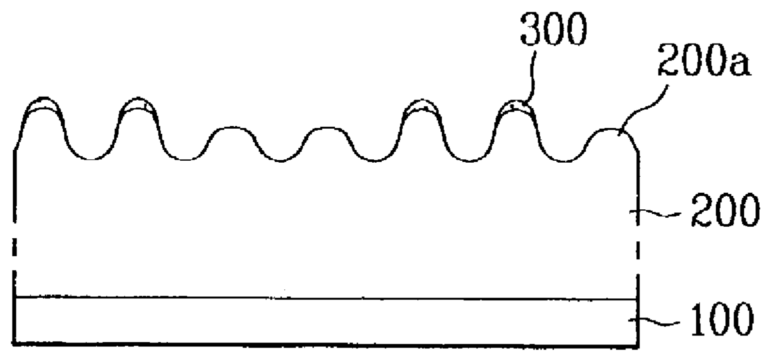
Figure 2D:
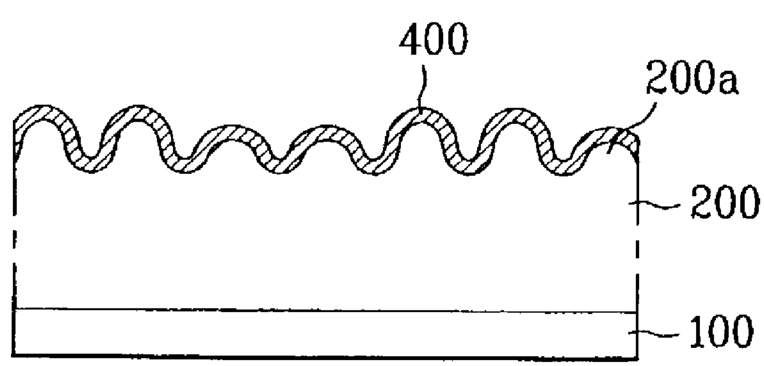

As shown in FIG. 2C, the organic insulating layer 200 is etched by a predetermined thickness by using the photoresist patterns 300 as the masks, thereby forming a plurality of protrusions 200*a* on a surface of the organic insulating layer 200. Preferably, SF type gas or $O_2$ type gas is used in a a dry etching process process for forming the protrusions 200*a*. If a predetermined portion of the organic insulating layer 200 that is relatively thick is etched, a protrusion 200*a* having a high height is formed. On the other hand, if a predetermined portion of the organic insulating layer 200 that is relatively thin is etched, a protrusion 200*a* having a low height is formed. Also, the photoresist patterns 300 having low height are removed during etching the organic insulating layer 200. Accordingly, the photoresist patterns 300 having high height remain on the organic insulating layer 200, thereby forming the protrusions 200*a* having various heights.

Although not shown, the organic insulating layer 200 may be patterned during formation of the protrusions 200*a*. Simultaneously, a contact hole may be formed for exposing a predetermined portion of a drain electrode of a thin film transistor below the organic insulating layer 200. The contact hole may be formed during an additional photolithographic process. Also, an etch-shielding layer is formed in order to prevent the organic insulating layer 200 from being over-etched between the thin film transistor and the organic insulating layer 200. For instance, an inorganic layer such as SiNx or a layer having a different etch ratio from the organic insulating layer may be formed at a thickness between 500 Å and 530 Å for protecting the thin film transistor.

After removing the remaining photoresist patterns 300, a reflective layer 400 is deposited on the pixel region of the organic insulating layer 200 having the plurality of protrusions 200*a* for being connected to the drain electrode of the thin film transistor through the contact hole. At this time, the reflective layer 400, which is made of any opaque material such as Al, Ag, MoW, Al—Nd alloy and Cr, is formed as a reflective electrode, thereby acting as a pixel electrode as well as the reflective layer. The reflective layer 400 has an uneven surface due to the plurality of protrusions 200*a* of the first organic insulating layer 20, so that it is possible to improve reflectivity of the reflective electrode.

Figure 3A:
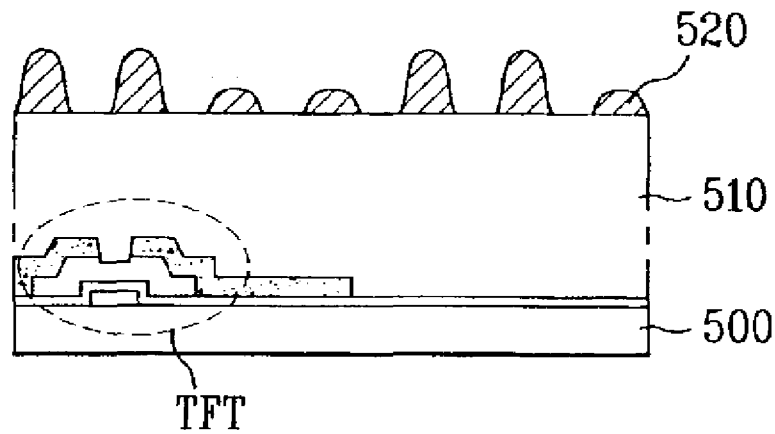
FIG. 3A to FIG. 3C are cross-sectional views for illustrating manufacturing process steps of a transflective type LCD device according to the second embodiment of the present invention.
Figure 3B:
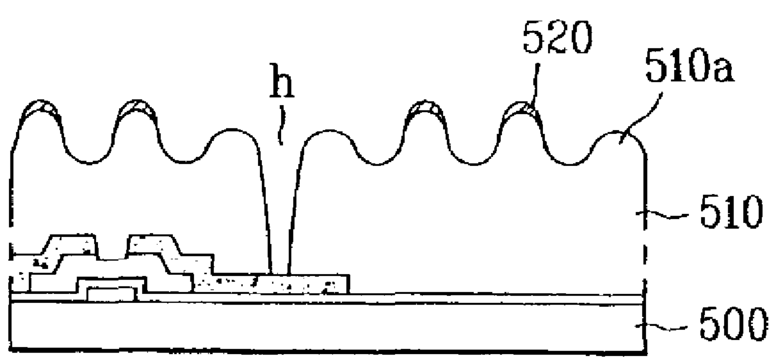
Figure 3C:
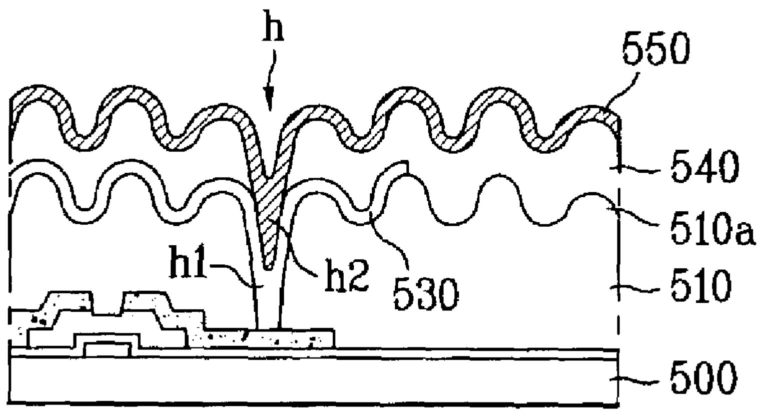

A method for manufacturing a liquid crystal display device according to the second embodiment of the present invention will be explained in detail. FIGS. 3A to 3C are cross-sectional views for illustrating manufacturing process steps of a transflective type LCD device according to the second embodiment of the present invention.

Referring to FIG. 3A, a plurality of gate and data lines (not shown) are formed on a substrate 500, and a plurality of thin film transistors (TFT) are formed at crossing points of the gate and data lines. A first organic insulating layer 510 is formed on the substrate 500 including the gate and data lines and the TFTs. Then, photoresist patterns 520 having various heights are formed on the first organic insulating layer 510. The photoresist patterns 520 are made in accordance with manufacturing process steps same as those explained in FIG. 2B. Then, as shown in FIG. 3B, the first organic insulating layer 510 is etched by a predetermined thickness by using the photoresist patterns 520 as masks, thereby forming protrusions 510*a* on a surface of the first organic insulating layer 510, and forming a first contact hole h1 for exposing a predetermined portion of a drain electrode of the TFT. At this time, the protrusions 510*a* are made in accordance with process steps same as those explained in FIG. 2C.

After removing the remaining photoresist patterns 520 shown in FIG. 3C, a reflective layer 530 is formed at a predetermined portion of the pixel region including the protrusions 510*a* for being connected to the drain electrode of the TFT through the first contact hole h1. At this time, the reflective layer 530, which is the reflective electrode, is made of an opaque metal layer. The reflective layer has a same structure as that of the reflective layer 400 in FIG. 2D.

Next, as shown in FIG. 3C, a second organic insulating layer 540 is formed on an entire surface of the substrate including the reflective layer 530, and a second contact hole h2 is formed for exposing a predetermined portion of the reflective layer 530. Also, a transparent electrode 550 is formed on the pixel region of the second organic insulating layer 540 for being electrically connected to the reflective layer 530 through the second contact hole h2. At this time, the transparent electrode 550 acts as a transmitting type pixel electrode, so that the transparent electrode 550 forms a lower substrate of the transflective type LCD device.

Figure 4:
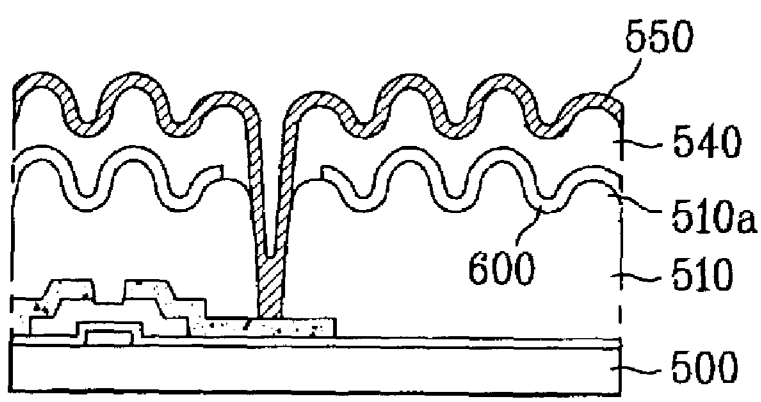
FIG. 4 is a cross-sectional view of a transflective type LCD device according to the third embodiment of the present invention.

A method for manufacturing a transflective type LCD device according to the third embodiment of the present invention will be explained as follows. FIG. 4 is a cross-sectional view of a transflective type LCD device according to the third embodiment of the present invention. The transflective type LCD device of the third embodiment of the present invention is made in accordance with process steps same as those explained in FIG. 3B.

In the transflective type LCD device according to the third embodiment of the present invention, a plurality of protrusions 510*a* are formed on a surface of a substrate 500 having a first organic insulating layer 510, and a reflective layer 600 is formed at a predetermined portion of a pixel region. At this time, it is not required to connect the reflective layer 600 to a drain electrode of a thin film transistor. Subsequently, a second insulating layer 540 is formed on an entire surface of the substrate including the reflective layer 600. A contact hole is formed by selectively removing the first and second organic insulating layers 510 and 540 so as to expose the drain electrode of the thin film transistor. Also, a transparent electrode 550 is formed on the pixel region of the second insulating layer 540 for being connected to the drain electrode of the thin film transistor through the contact hole.

As mentioned above, the liquid crystal display device according to the present invention has the following advantages.

First, the protrusions having various heights are formed on the surface of the single insulating layer, and then the reflective layer is formed on the insulating layer including the protrusions, thereby simplifying manufacturing process steps and decreasing production cost.

Also, the metal layer is formed on the insulating layer including the protrusions having various heights, so that the metal has the uneven surface due to the protrusions having various heights. Accordingly, it is possible to obtain a high quality reflective or transflective type LCD device having a wide viewing angle.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a liquid crystal display device comprising:

(a) forming an insulating layer on a substrate;

(a') depositing a photoresist layer on the insulating layer, and (b') irradiating the photoresist layer with UV radiation through a diffraction mask to form the photoresist patterns having various shapes and heights on the insulating layer;

(c) etching the insulating layer by using the photoresist patterns as masks to form protrusions on a surface of the insulating layer; and (d) forming a reflective layer on the insulating layer including the protrusions.

2. The method of claim 1, wherein the insulating layer is an organic insulating layer.

3. The method of claim 2, wherein the insulating layer is etched by a dry etching process.

4. The method of claim 1, wherein the reflective layer is a metal layer.

* * * * *

UNITED STATES PATENT AND TRADEMARK OFFICE

CERTIFICATE OF CORRECTION

PATENT NO. : 7,006,179 B2
APPLICATION NO. : 10/329959
DATED : February 28, 2006
INVENTOR(S) : Hye Young Kim It is certified that error appears in the above-identified patent and that said Letters Patent is hereby corrected as shown below:

In the Claims

Column 8 line 1, before “etching the insulating” delete “(c)” and substitute --(b)-- in its place.

Column 8 line 4, before “forming a reflective layer” delete “(d)” and substitute --(c)-- in its place.

Signed and Sealed this

First Day of August, 2006

JON W. DUDAS
*Director of the United States Patent and Trademark Office*